H. BRAMHALL & E. BLAYDES.
Attaching Handles to Cutlery.

No. 231,392. Patented Aug. 24, 1880.

Witnesses
W. H. Phillips
E. W. H. Phillips.

Inventors
Henry Bramhall
Edward Blaydes
Per Attorney
Charles G. C. Simpson

UNITED STATES PATENT OFFICE.

HENRY BRAMHALL AND EDWARD BLAYDES, OF SHEFFIELD, ENGLAND; SAID BRAMHALL ASSIGNOR OF HIS ENTIRE INTEREST AND SAID BLAYDES ASSIGNOR OF ONE-THIRD OF HIS RIGHT TO JOHN ALFRED BLAYDES AND JOSEPH WRAGG, OF SAME PLACE.

ATTACHING HANDLES TO CUTLERY.

SPECIFICATION forming part of Letters Patent No. 231,392, dated August 24, 1880.

Application filed February 25, 1880. Patented in England October 8, 1879.

*To all whom it may concern:*

Be it known that we, HENRY BRAMHALL and EDWARD BLAYDES, both of Sheffield, in the county of York, England, Kingdom of Great Britain and Ireland, have invented certain new and useful Improvements in Hafting Cutlery, &c.; and we do hereby declare that the following is a full, clear, and exact description of the same.

This invention relates to a new method of forming the bolsters of the handles and of securing the blades in the handles of knives, forks, dirks, and all tools, instruments, implements, and other articles requiring handles similar to those about to be described and claimed.

Figure 1:
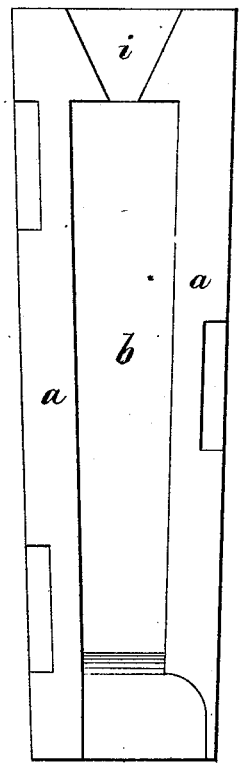
Figure 2:
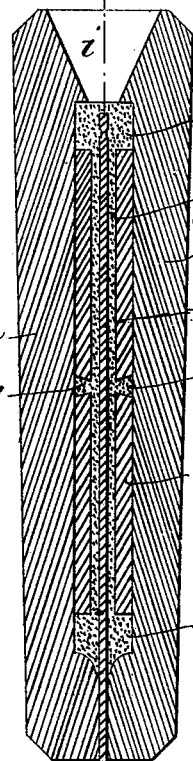
Figure 3:
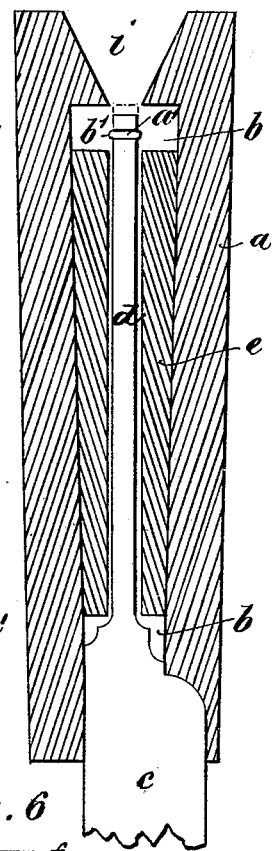
Figure 8:
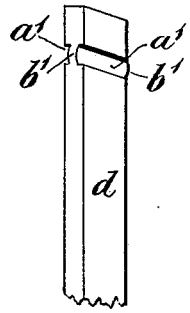
Figure 9:
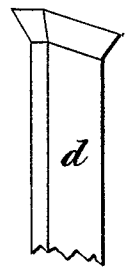
Figures 4, 5:
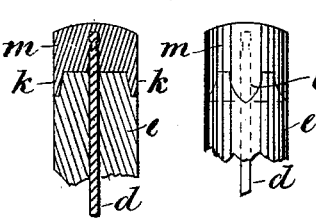
Figure 6:
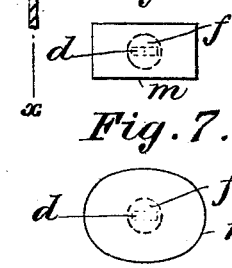
Figure 7:
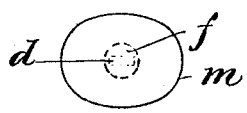

In the drawings hereunto annexed similar letters of reference indicate like parts, and Figure 1 is a plan of one half of mold for carrying our invention into effect. Fig. 2 is a transverse vertical section of the complete mold, showing tang of knife or other article intended to be hafted within the mold, also the metal by which it is secured. Fig. 3 is a vertical section on line $x$ $x$, Fig. 2, without the said metal. Figs. 4 and 5 show modifications of cap or bolster. Figs. 6 and 7 show plans of ends of handles. Figs. 8 and 9 show modification of end of tang.

As shown in Fig. 1, letter $a$ is half of a mold, having within it a recess, $b$, the exact configuration of the intended handles, and having also a space to receive the portion of the blade, &c., $c$, next or adjacent to the handle.

The mold $a$ is made in two parts, in a manner similar to that in which molds in general are made, the other half of the mold having a recess to receive the other half of the handle and blade.

The blade or part of the knife, fork, dirk, tool, or other article, $c$, intended to be hafted is provided with a tang, $d$, extending the entire length of the handle when finished, (see Figs. 2 and 3,) and thereby reaching nearly to the top of the recess $b$.

As shown in Figs. 2, 3, 4, and 6, the handle is of rectangular cross-section, the mold delineated being for that configuration; but the handle, if desired, may be elliptical, (see Fig. 7,) or in fact of any form, in cross-section.

The handle $e$ may be of wood, ivory, or any other substance shaped and reduced to the proper size to fit within the mold. It is provided with a longitudinal central opening, $f$, through which the tang $d$ passes, as shown in the drawings. The handle $e$ does not extend the entire length of the recess $b$, but falls short both at the top and bottom.

In addition to the passage $f$, formed through the handle longitudinally, transverse holes or openings $g$ may also be provided. These may either be parallel or dovetailed, as shown, or otherwise formed to give greater hold to bind the whole together, forming different designs.

$i$ is an opening formed in the mold, of ordinary configuration, for pouring metal or other substances into the mold.

The method of operation is as follows: Having provided a mold, $a$, in the form already described and the handles to fit the said mold, the handles being provided with the passage $f$, also as many openings $g$ as may be desired for the purpose of security and ornamentation, (we wish here to remark that the openings $g$ may be dispensed with, if desired;) furthermore, having provided the blade or part of the knife, fork, dirk, tool, or other article, $c$, intended to be hafted with the tang $d$, as described and shown, we introduce the tang $d$ into the handle $e$. We then place them in the mold, as shown in Figs. 2 and 3, which is then placed and held in position with the opening $i$ at the top, and having provided a quantity of "white" or other metal or compound of other metals or other substances, we heat the metal or compound to a molten state or otherwise render it fluid and pour a sufficient quantity into the mold $a$.

As indicated by the dots in Fig. 2, as a further means of securing the bolster $m$, we provide the tang with recesses or a dovetailed end, as shown in Figs. 8 and 9. The recesses and projections shown in Fig. 8 are formed in the tang after the handle is put on by introducing the tang between a pair of pinching-dies, forming the recesses $d$, and at the same time forcing out the metal sidewise and forming side projections, $b'$, so that when the molten metal forming the bolster $m$ flows in it interlocks with the recesses $a'$, and the projections $b'$ interlock with it. The same thing would be carried into effect by simply crushing the end of the tang and spreading it either edgewise or sidewise. In fact this object may be accomplished in so many manners equivalent to what is above described, which would suggest themselves to any ordinary workman, that we feel it would be useless to go further with this description of them except to say that the tang may also be provided with an enlarged or dovetailed end, as shown in Fig. 9; but as the passage $f$ must be enlarged, or the tang $d$ must be decreased, to enable the enlarged end formed by the dovetail to go through the passage, we do not favor this method of carrying this part of our invention into effect, but merely show it as what we consider an equivalent of Fig. 8 and its description.

When the metal has cooled the mold may be opened and the final polishing up and finishing of the handle executed.

Although the handle is shown in Figs. 2 and 3 with straight sides, that form is not indispensable in the carrying into effect of our invention, as has been already stated. The handle may be of any configuration or cross-section. It may also, if desired, be longitudinally curved and provided with a curved passage, $f$, in which case the tang $d$ will be curved to correspond.

Figs. 4 and 5 show the caps or bolsters $m\ m'$ at the ends of handle. If the handle is made with a simple flat end, as shown in Figs. 2 and 3, the edge of junction between the bolster and the knife will be plane—that is to say, straight; but if it is desired to give a fancy edge, as shown in Fig. 5, this can be easily effected by cutting pieces off the handle $e$, as shown at $k$ in Fig. 4, and according to the configuration of these cuttings the projections $l$ of the caps or bolsters $m\ m'$, Fig. 5, will be formed. If the cutting $k$ is carried completely round it forms the bolster into a cup or cap and ferrule combined, which materially assists in further securing the tang and handle $e$ together, and enables an increased varying of the patterns or designs and decreases the probability of the handle $e$ splitting, or in case of its splitting retains the separated parts in position. In fact, if desired, the handle $e$ in this case may be made or built up of parts of similar or varying materials, and thus bound together by this means as well as by the projections $h$, in which case no difficulty would be found in using the dovetailed end shown in Fig. 9.

What we claim, and wish to secure by Letters Patent, is as follows:

The combination of the tang $d$, having recesses and projections $a'\ b'$, handle $e$, having passage $f$, and cuttings $k$, bolsters $m\ m'$, and filling of the passage $f$, said filling of passage $f$, bolsters $m\ m'$, and cuttings $k$ being cast in one piece, the whole as described.

Sheffield, 22d day of January, A. D. 1880.
   H. BRAMHALL.
   EDWARD BLAYDES.

In presence of—
 ARTHUR BELL,
 EDWD. DODGSON, Jr.